April 12, 1960

E. H. LESLIE 2,932,393

PROCESS AND APPARATUS FOR BENEFICIATING MINERAL AGGREGATES

Filed Aug. 24, 1955

INVENTOR
Eugene H. Leslie

United States Patent Office 2,932,393
Patented Apr. 12, 1960

2,932,393

PROCESS AND APPARATUS FOR BENEFICIATING MINERAL AGGREGATES

Eugene H. Leslie, Ann Arbor, Mich.

Application August 24, 1955, Serial No. 530,385

7 Claims. (Cl. 209—119)

My invention relates to a process and apparatus for beneficiating mineral aggregates and particularly to the continuous processing of loose aggregates of mineral particles containing components which differ from one another in size, shape, strength, density, mineral components and structure, hardness, elasticity, porosity, water-absorption, and other properties, so as to remove certain undesired classes of particles and to yield a product richer in certain other desired classes of particles which classes in particular, differ mainly in elastic moduli, strength, hardness, porosity, water-absorption, and mineral components and structure.

One problem to which my invention provides a new and very effective solution is the beneficiation of washed and sized natural gravel for use as coarse aggregate in concrete, with respect to its content of materials known to be deleterious to concrete. Rock particles in such gravel may be qualitatively classified as "hard" stone, "soft" stone, "hard absorbent" stone, chert, encrusted stones and thin elongated stone, of which only hard stone is desirable in concrete. Hard stones are those other than chert which are not scratched by a file and are of low porosity. Soft stones vary from crumbly materials to pebbles which are appreciably scratched by a file. Thin elongated stones are sufficiently described by their name. Encrusted stones are pebbles having patches of small particles cemented to the surfaces sometimes covering a substantial portion of the surface area. Hard absorbent stones are those which are scratched only slightly by a file, if at all, but which are porous and absorb water to an extent to cause deterioration by freezing and thawing. The cherts are highly siliceous rocks, some of the lighter and more porous of which may be deleterious. Also cherts from some areas are of such chemical composition as to react with Portland cement, causing weakness in the concrete; these too are deleterious.

Natural gravel often contains one or more of these deleterious components greatly in excess of the amounts permitted by specifications for coarse aggregate for concrete and there has long been a great interest in and need for a simple, cheap and effective system for improving the quality of gravel by reducing to a small amount the content of these deleterious materials in the product. The system of my invention is useful for effecting any practical enrichment of hard stone with respect to soft stone to the recovery of a product substantially free of soft stone as well as substantial enrichment of hard stone with respect to thin elongated stones, encrusted stones and hard absorbent stone. In addition, there seems to be slight beneficiation of the product with respect to chert content, although I do not regard the present invention as an adequate solution of the chert removal problem. In the following discussion, emphasis is placed on beneficiation of the product with respect to hard and soft stone components and the examples given do not refer to the accompanying important beneficiation with respect to hard absorbent stone or to the incidental improvement with respect to chert.

Various systems have been proposed for the beneficiation of such mineral aggregates and some of them, which operate on the principle of separation by difference in density of the minerals, have had a fair measure of commercial acceptance. Such systems are inherently incapable of avoiding inclusion of a substantial portion of soft stones with the sound stone product, and, also including a substantial portion of sound stone in the soft stone rejects which cannot be overcome due to the overlap in density between the desired and undesired components. Such systems are unable to make any shape discrimination or to separate particles which have a high degree of water absorbency from other heavy materials. These systems require, furthermore, a very substantial capital investment and involve a substantial operating cost per ton of material treated.

It has also been suggested that mineral aggregates may be separated into products predominating in harder and softer components by applying the principle of difference in resilient rebound from an elastic body, as proposed, for example, in Pearse Patent 873,326 granted December 10, 1907 and Stevens Patent 2,260,095 granted October 21, 1941. None of these suggestions have, however, found commercial acceptance in the field of gravel preparation according to my information and belief after extensive investigation of this art. The invention disclosed in these specifications employs the principle of elastic resilient rebound on impact for beneficiation of mineral aggregates, utilizing certain discoveries of mine many of which are also disclosed in my co-pending application Ser. No. 530,331 filed August 24, 1955; but the present invention relates particularly to a method and apparatus involving recycle of certain portions of the aggregates in a novel manner not disclosed or claimed in the said co-pending application. The improvements here disclosed greatly facilitate efficient continuous production of a sound aggregate product containing any specified and predetermined maximum content of soft stones with a soft-stone discard product containing any desired and predetermined amount of hard stone.

The principal object of the present invention is to improve the recovery of hard stones from raw aggregate continuously, recovering a high quality product and discarding only a relatively small amount of residue so depleted of hard stone as not to justify further processing.

I will now describe my invention with reference to the annexed drawings, in which.

Figure 1:
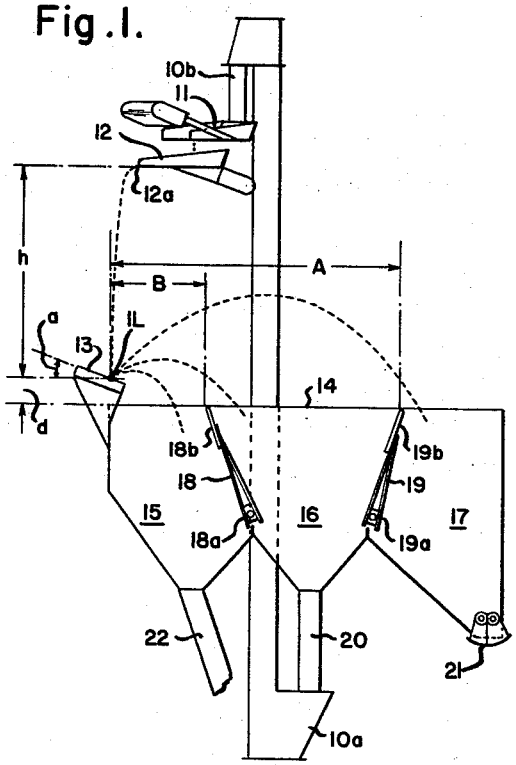
Fig. 1 is a schematic diagram of one simplified form of the apparatus of a single stage-system employing my invention, shown in elevation.
Figure 2:
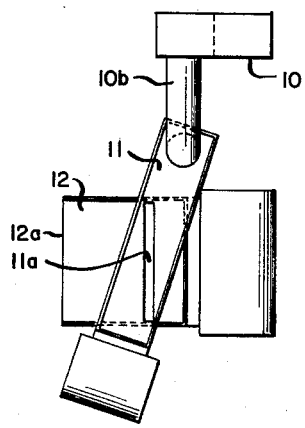
Fig. 2 is a plan view of certain elements shown in elevation in Fig. 1.

I will briefly describe the apparatus in Figs. 1 and 2 before proceeding with a discussion of my system and the various factors involved in its operation.

An elevator 10 is provided to deliver aggregates fed into the boot 10a through a discharge spout 10b into a suitable distributing feeder 11. The elevator may be of conventional design known to persons skilled in the art of material handling. Referring particularly to Fig. 2, the distributing feeder 11 is preferably of the electrically-vibrating type arranged diagonally across and above a generally horizontal and relatively wide conveyor 12, there being a diagonal discharge slot 11a in the pan of conveyor 11 of substantially the same width as the latter. The aggregates are transferred through slot 11a from one conveyor to the other and distributed substantially in a mono-layer on conveyor 12, which is also preferably of the electrically-vibrating type, and are advanced in such mono-layer until the pebbles individually topple over the discharge edge 12a of conveyor 12 to fall freely in parabolic paths which differ slightly for different sized pebbles, a typical path being indicated by dash lines on Fig. 1. The mono-layer is thus distributed from a substantially planar sheet on conveyor 12 to a stream of defined width, which may be about 6″ after an 8-ft. fall. Below the feeder at some fixed distance "$h$" is disposed an impact slab 13 made of an elastic and hard but tough material, as for example, hardened steel, inclined at an angle "$a$" to the horizontal in a plane parallel to the discharge edge of the feeder 12. The impact slab 13 is made with a length somewhat greater than the width of the conveyor 12, and with a width such that the pebbles falling from the conveyor 12 will always impinge upon it at different rates of flow and correspondingly different trajectories of the falling aggregates. The average center line at the area of impact is called the "impact line" in these specifications, indicated on Fig. 1 by the legend IL. Slab 13 is of such thickness and is so supported that it is relatively rigid against flexure and responds elastically to impact of the mineral aggregate particles by compressive rather than by flexural deformation. Below the impact slab 13 is provided a hopper 14 arranged to collect portions of the aggregates of different composition which fall after rebound from the plate 13. This hopper 14 is divided into three collecting portions 15, 16, and 17 by means of the adjustable dividers 18 and 19, the compartment 15 being adjacent the impact plate, while compartments 16 and 17 are, respectively, at successively greater distances from the impact slab 13. The dividers 18 and 19 may be conveniently made in the form of hinged partitions mounted at their bases on adjusting shafts 18a and 19a, and be provided with radially adjustable plates 18b and 19b to maintain the tip of each divider at a controlled elevation $d$ with respect to the impact line. By means of these dividers 18 and 19, the horizontal distances "A" and "B," from the impact line to the points of separation between the three compartments 15, 16, and 17, may be readily adjusted. A chute 20 is connected between the bottoms of the middle compartment 16 and the feed boot 10a of the elevator 10, providing automatic recycle of aggregates rebounding into the intermediate compartment 16.

It is apparent that compartment 17 will collect the aggregates product rebounding with trajectories having a range greater than the distance "A," or setting of the divider 19, while compartment 15 will collect the aggregates rejects rebounding with trajectories having a range less than the distance "B." The beneficiated aggregates product is recovered in compartment 17, and its quality is determined by the setting of the divider 19. A discharge gate 21 may be provided on hopper 17 to permit controlled removal of such product, and a chute 22 may be provided to remove the "discard" from compartment 15. The composition of the portion of the aggregate collected in compartment 16 is preferably set, by suitable adjustment of divider 18, as will be presently explained, to be substantially the same as that of the raw aggregates fed to the system, and returned through chute 20 to mingle with such raw feed for recycle without substantial alteration in composition. The portion collected in compartment 15, containing a greater excess of soft stone, may still contain sufficient hard stone to warrant further treatment and I prefer to provide a second treating stage, similar in all essential respects to that shown in Fig. 1, arranged adjacent to the first stage, in which case the chute 22 of the first stage leads to the boot of the elevator 10a of the second stage, providing continuous flow of aggregates from stage to stage.

The best results are obtained with the system of Fig. 1 under the conditions discovered and disclosed by me in my co-pending application Ser. No. 530,331 filed August 24, 1955, namely that the distance $h$ is fixed at about 8 feet; the angle $a$ at which the impact plate is inclined, is fixed at about 22½° and the distance $d$ is as small as practicable. The rate of feed per foot of width of the feeder 12 may be varied over a wide range.

With such two stage system the aggregate feed to be beneficiated is fed to the boot 10a of the first-stage elevator 10, and the product enriched in hard stone content is removed from the product compartments 17 of both stages. The remainder of the aggregate feed removed from the system is taken from discard compartment 15 of the second stage only, and consists of most of the soft stones along with only a small portion of the hard stone, most of which has gone into the beneficiated product. In subsequent discussion, the aggregates at various states of treatment in a two-stage plant according to my invention will, for brevity, be denoted by the following symbols:

| Symbol: | Significance |
|---|---|
| $F_1$ | Raw feed to first stage. |
| $F_2$ | Feed to second stage, from discard compartment 15 of the first stage. |
| $R_1$ | First stage recycle from compartment 16 of that stage. |
| $R_2$ | Second stage recycle from second stage compartment 16. |
| $P_1$ | Product portion from compartment 17 of first stage. |
| $P_2$ | Product portion from compartment 17 of second stage. |
| $D_1$ | Discard from compartment 15 of first stage. Used only with reference to a single-stage system, $D_1$ and $F_2$ being the same in a two-stage operation. |
| $D_2$ | Final discard, from compartment 15 of the second stage. |
| $P$ | Total recovered product, namely, $P_1+P_2$. |

As an illustrative example, I will described the application of my system to the continuous processing of 100 tons/hr. of washed natural glacial gravel containing 95% hard stone and 5% soft stone graded to size No. 10-A, which ranges ⅜″ through 1″ in pebble size. As I have pointed out in my application Serial No. 530,331, it is a distinct advantage to treat the material by my process while the material is wet. To this end I preferably take the stone to be treated directly from the washer or alternatively wet the stone before passing it to the feeder. The drop height $h$ in this example is set at 8 ft. which I will hereafter show is optimum in the practice of this invention, and the inclination of the impact plate $a$ is set at 22°–50′. The distance $d$ is about 13 inches in this example although the yield will be somewhat better if $d$ is less. Let the object be to produce gravel meeting specifications which limit the soft stone content of products $P_1$ and $P_2$ to 0.5%.

Under the conditions specified, the divider 19 of the first stage is set at a distance A of about 48.6 inches beyond the impact line, and the divider 18 of the first stage is set at a distance B of about 23.2 inches from the impact line. With 100 tons/hr. feed, when the continuous operation has established equilibrium, uniform flow, this effects recovery of 76.8 tons per hr. of product P–1 enriched to contain 99.5% hard and 0.5% soft stone in first-stage compartment 17, recycle of 60.5 tons per hr. of a fraction $R_1$ containing about 95% hard and 5% soft stone through compartment 16 and back to the system, and the passing of 23.2 tons per hr. of aggregates containing about 21% soft stone through compartment 15 and chute 22 of the first stage as the feed $F_2$ to the second stage elevator. The 100 tons/hr. feed $F_1$ is equal, of course, to the gross effluent from stage 1, namely $P_1+F_2$, or 76.8 tons per hr. plus 23.2 tons per hr.; but the rate of material flow through the elevator and conveyors impinging on the impact plate of the first stage is the sum of the feed $F_1$ plus the recycle $R_1$, 100 and 60.5 tons per hr. respectively, totalling 160.5 tons per hr. which determines the required capacity of the material handling equipment and the impact slab for the first stage.

Continuing this example through the second stage, the 23.2 tons per hr. of residue from the first stage which is the feed $F_2$ of the second stage, having a much higher soft stone content than the original feed, requires correspondingly greater enrichment to yield the specified gravel product, and the divider 19 must correspondingly be set at a greater distance from the impact line. In this case the second stage dividers 19 and 18 are set at the respective distances of 64.7 and 16.8 inches from the impact line. The product $P_2$ then amounts to 16.4 tons per hr. of the required gravel containing 99.5% hard and 0.5% soft stone, the final discard $D_2$ is 6.8 tons per hr. of residue consisting of about 33% hard and 67% soft stone, while the recycle $R_2$ is 45.5 tons per hr. of aggregates of substantially the same composition of the feed $F_2$. The overall material balance shows a total product P recovered at the rate of 93.2 tons per hr., being the sum of $P_1$ and $P_2$ or 76.8+16.4, and a discard $D_2$ of degraded aggregates at the rate of 6.8 tons per hr., totalling 100 tons per hr., being the same as the feed $F_1$.

Figure 3:
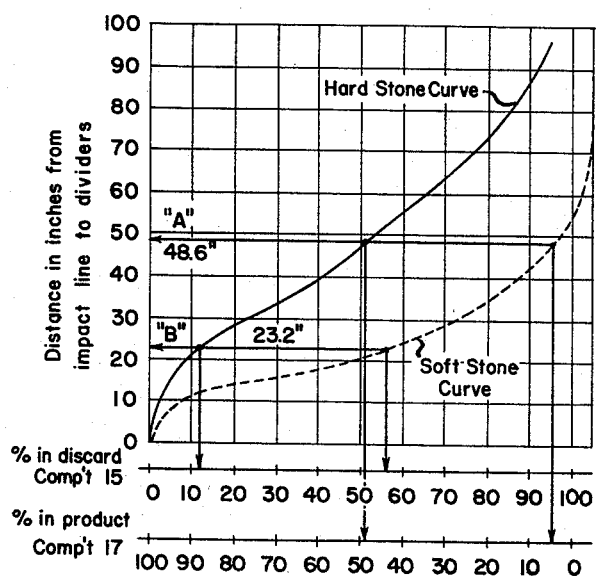
Fig. 3 is a graph showing the distribution of hard stone characteristic of an illustrative embodiment of my invention.

The foregoing operation may be better understood by referring to Fig. 3, which is a graph showing the effect of the location of the dividers 18 or 19 on the distribution of hard and soft stone in the compartments. These curves are based on data which I obtained from extensive experiments in separations by resilient rebound, in particular those using glacial gravel from ⅜″ to 1″ in particle size as the feed material, under conditions in which the height of fall $h$ was maintained at 8 feet. The impact slab inclination $a$ was 22° 50′, and the elevation $d$ of the impact line above the dividers was about 13″, being the same conditions specified in the preceding example of my system. The hard and soft stone components are both scattered by resilient rebound and part of each is collected in the compartments 15, 16, and 17. However, the statistical distribution of hard stone and of soft stone rebounding through different ranges is not the same, and it is, of course, the difference between these statistical distribution patterns which makes separation possible at all. In Fig. 3, the ordinate or vertical scale is the distance in inches from the rebound line to a divider, and the abscissas or horizontal scales show the percent of mineral aggregate collected on each side of a divider. The scale read from left to right indicates the percent of the aggregates collected between a divider and the impact slab, i.e., in compartment 15 in the case of divider 18 and in compartments 15 and 16 combined in the case of divider 19, while the scale read from right to left shows the percent of aggregates which rebound beyond the divider, i.e. the aggregates collected in both compartments 16 and 17 in case of divider 18, and the aggregates collected in compartment 17 in case of divider 19.

Two curves are shown on Fig. 3. The solid-line curve is drawn for "hard stone" whereas the broken-line curve is drawn for "soft stone." Thus, when the distance "A" is adjusted to 48.6 inches as in the given example, first stage, referring to the right to left horizontal scale it will be found from the solid-line curve that compartment 17 collects 49% of all the "hard stones" rebounding from slab 13; and similarly from the broken-line curve it is found that 4.8% of all the "soft" stones rebounding from the impact plate are also collected in compartment 17. The total amount of aggregate rebounding and scattered into the compartments being 100 tons/hr. of feed plug 60.5 tons per hr. of recycle, or 160.5 tons per hr. in all, of which 95% or 152.5 tons/hr. is hard stone and 5% or 8.02 tons/hr. is soft stone, the recovered product $P_1$ is comprised of 49% of 152.5 tons/hr. hard stone, namely 74.7 tons/hr., plus 4.8% of 8.02 tons/hr. soft stone or about .385 tons/hr., the total product being 75.1 tons/hr. of gravel, as set forth in the example given. Similarly, with the distance "B" to the divider 18 fixed at 23.2 inches, referring to Fig. 3 it is seen that about 12% of the hard stone and 56% of the soft stone fall into the discard compartment 15, which therefore comprises 12% of 152.5 or 18.6 tons/hr. hard stone and 56% of 8.02 or 4.6 tons/hr. of soft stone, totalling 23.2 tons/hr. of material containing 20% soft stone in the example given previously. The remainder of the rebounding pebbles are collected in compartment 16 for recycle. The hard stone content of the recycle $R_1$ is the difference between 152.5 tons/hr. and the sum of the hard stone in the product $P_1$ and the discard $D_1$ (76.5+18.6 or 95 tons/hr.), being 57.5 tons/hr., while the soft stone content of the recycle $R_1$ is the difference between 8.02 tons/hr. and the sum of the soft stone in the product $P_1$ and the discard $D_1$ (.385+4.6 or 5.0 tons/hr.) or about 3 tons/hr. The recycle $R_1$ thus totals 57.5 tons/hr. hard plus 3.0 tons/hr. soft, or 60.5 tons/hr. as set forth in the example previously given.

The same mode of analysis applies to the operations carried out in the second stage, which are similar to the corresponding operations in the first stage, the only difference being the amount and composition of the feed material.

Distribution curves such as those in Fig. 3, which are typical, are calibration curves for the divider settings and may be expected to vary somewhat in different plants and for different grade and type of gravel. If available for a given plant and given raw material, they may be useful in predetermining the distances "A" and "B" for making various products in that plant from such raw materials. These settings can, however, readily be determined by the trial run method which would be used in any event to make the final adjustment even when approximate settings are calculated and made in advance; and Fig. 3 is referred to and discussed here only to clarify the principle of operation of my invention.

It will be observed on Fig. 3 that the "soft stone" curve terminates on the right at a point where practically none of the soft stone rebounds into the product compartment, the divider setting then being about 80 inches from the impact line; while at the same divider setting about 15½% of the hard stone rebound over the divider substantially free of soft stone. Hence with the dividers 19 adjusted to a distance "A" of about 80 inches, a substantially "pure" hard stone product may be made. With a feed $F_1$ of the same washed glacial gravel containing 5% soft stone as in the previous example, the reject divider 18 in the first stage would then be set at a distance "B" of about 13 inches to reconstitute a gravel containing 5% soft stone recycling through compartment 16 under equilibrium conditions of continuous operation. The rate of recycle required per stage increases as the soft stone tolerance in the product decreases, and is maximum, of course, when making a product free of soft stone. In this case $R_1$ would be about 475 tons/hr., which, added to the 100 tons/hr. feed, requires a 575 ton/hr. capacity for the elevator 10, feeders 11 and 12, and impact plate. Of this flow, 5% or 28¾ tons/hr. is soft stone, none of which enters the product, and 95% or 546¼ tons/hr. is hard stone of which about 15½% or about 84.6 tons/hr., theoretically, would be recovered as the product $P_1$ in compartment 17. However, with such high rate of recycle causing a portion of the hard stones to rebound many times from the impact plate before finally escaping from the system through a product compartment, a small amount, in the order of 1% of the hard stones are fractured and some of these fragments behave more like soft stones and are eventually discarded, so that the actual product $P_1$ is found to be short of the 84.6 tons/hr. theoretical yield.

The divider setting "B" of 13 inches causes about 1.9% of the 546¼ tons/hr. of hard stones to be intercepted by divider 18 and caught in compartment 15 along with 17.7% of the 28¾ tons/hr. of soft stones, or about 10.4 tons/hr. of hard and 5.0 tons/hr. of soft stones. This is augmented by some fractured hard stone particles as explained above, and constitutes the feed $F_2$ which totals something in excess of 15.4 tons/hr. containing about 32% soft stone. The recycle $R_1$ is the remainder, or about 451 tons/hr. of hard and about 24 tons/hr. of soft stone totaling about 475 tons/hr. of aggregates containing 5% soft stone as stated above.

In the second stage of treatment, the divider 19 is adjusted to a distance "A" of about 80" for recovery of "pure" hard stone as before in second-stage compartment 17, and the setting "B" for the discard divider in the second stage is also found to be about 13", very near to the location of the discard divider in the first stage. The recycle $R_2$ of aggregates containing about 32% soft stones, or of the same composition as $F_2$, is about 78 or more tons/hr., which added to the 15.4 or more tons/hr. of feed will require 93.4 or somewhat greater tons/hr. capacity of the elevator and feeders of the second stage. The "pure" hard stone product $P_2$ is found to be around 9 tons/hr., more or less, and the final discard $D_2$ comprises all the 5 tons/hr. of soft stone and 1 or 2 tons/hr. of hard stone including fragments of fractured stones. The amount of such fragmentation varies with different types of rocks having different mineral structure and strength; but the yield of pure hard stone in the example here given, using a two stage system of my invention and processing typical glacial gravels, exceeds 90% of the genuine hard stones in any event.

While I have given the most favorable conditions such as the impact slab angle $a$, the relative elevation $d$ of the dividers with respect to the impact line, and the drop height $h$, these may be varied somewhat from those specified, in which case, of course, the dividers would have to be set at different positions to obtain the same products $P_1$ and $P_2$. Such variation, however, affects the production of the system unfavorably, one such effect being to increase amount of the discard $D_1$ delivered as feed $F_2$ to the second stage as well as to increase the rate of recycle required in both stages, which results in decreasing the rate of production that can be obtained from a plant having elevators, conveyors, and impact slabs of a given capacity.

Figure 4:
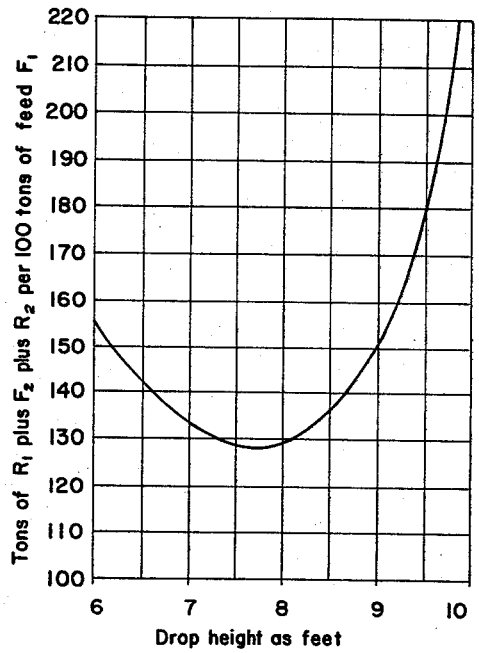
Fig. 4 is a graph showing the effect of modifying one of the variable factors, namely the height of particle fall before rebounding impact, on the operation of my system.

In this regard it is particularly important to set the drop height $h$ at the optimum distance of about 7½ to 8 feet. The importance of the drop height $h$ in the recycle system of my invention is significantly shown by Fig. 4, which is plotted from extensive data obtained in my experimental separations. The constant factors in Fig. 4 are that the feed rate $F_1$ is 11 tons/hr. of glacial gravel ranging from ⅜" to 1" in size and containing 95% hard and 5% soft stone; that the product removed as $P_1$ and $P_2$ is bridge stone containing 99.5% hard and 0.5% soft stone at a rate of a little over 90 tons/hr., using a two stage system; that the impact slab inclination $a$ is 22°50' and the distance $d$ of the impact line above the dividers is about 13". The drop height $h$, however, was varied through the range of 6 to 10 feet, inclusive, the dividers being adjusted in each case to effect the specified enrichment of the product. The horizontal scale in Fig. 4 is the drop height $h$ in feet, while the vertical scale is the sum of recycle flows $R_1$ and $R_2$ plus the second stage feed $F_2$. Thus, for the 8-ft. drop height these are the same values previously given in the example, namely, $R_1=60.5$, $R_2=45.5$ and $F_2=23.2$, the total being 129 tons/hr., which is the value on the vertical scale of Fig. 4 corresponding to the 8-ft. reading on the horizontal scale. These three rates of flow reflect the efficiency of the system, being internally created flows in contrast with the feed $F_1$ which is predetermined, and the operation should be effected under conditions at which they are minimum. Such minimum is seen in Fig. 4 to lie in the region of about 7½ to 8 feet drop height, the curve increasing rapidly with increase in drop height on the one hand and with decrease in drop height on the other.

While I have, in the foregoing example, selected an intermediate fraction whose composition is identical with that of the natural aggregate, a fraction may be selected which varies from the natural aggregate. In this event the feed will be the equilibrium mixture between the natural aggregate and the recycled intermediate fraction.

My research indicates that there is a definite relationship between the product divider setting, the percentage of the feed going into the product and the discard divider setting. I have found that the product of the product divider setting and the percentage of feed going into the product will give the approximate discard divider setting. This relationship is quite useful in setting up the dividers for any particular product.

The dominant characteristic of the herein disclosed invention, however, resides in blending the greatest possible part of the aggregate in flow which is too rich in soft stone for removal as product, into a portion controlled to have substantially the same composition as the original feed, discarding only a highly degraded residue which cannot be blended with such portion without lowering the soft stone content below that of the original feed. This is effected by taking advantage of the statistical distribution of hard and soft pebbles rebounding through ranges less than the range at which the product is collected, and by a second divider to reconstitute from the scattered rejected pebbles a mixture identical with the original feed suitable for continuous return to the process. The hard and soft pebbles are thus recycled until they eventually rebound into compartment 17 and leave the stage with the beneficiated product or rebound into compartment 15 and leave the stage with the degraded discard. This not only permits the same apparatus elements to rework a substantial part of the rejected pebbles continuously along with the feed, which is a new result, but furthermore actually reduces the total amount of material in flow to be handled, as compared, for example, to successively re-running all the rejected pebbles proposed in Stevens Patent 2,260,095 for example.

It is understood that Figs. 1 and 2 are diagrammatic drawings of my system and that the details of construction may be selected in accordance with good engineering practice as will be understood by those skilled in the art. The invention may be embodied in the single or double stage form or in any multiplicity of stages depending upon the economics of the separation and the product desired. For example, if further refinement is required, a three stage unit could be used, and the detailed example of my system is merely illustrative of my invention, which is set forth in the accompanying claims.

I claim:

1. A method of recovering a hard stone enriched component from natural aggregate containing hard stones and soft stones comprising the steps of feeding the aggregate into space, accelerating the aggregates by free fall in unrestrained parabolas until they have acquired a kinetic energy of about 7.5 to 8 foot pounds per pound of aggregate, impinging the aggregates on a hard, rigid elastic surface inclined to the horizontal, intercepting in flight at a predetermined range of rebound a portion of the aggregates rebounding from said inclined surface having a hard stone and soft stone ratio substantially identical with that of the natural aggregate, collecting as the enriched product all aggregates rebounding beyond said predetermined range, returning the intercepted aggregate to the feed and repeating the cycle until no portion rebounds beyond said predetermined range and thereafter discarding the portion falling short of said predetermined range.

2. A method of recovering a hard stone enriched component from natural aggregate containing hard stones and soft stones comprising the steps of feeding the aggregate into space, accelerating the aggregates by free fall in unrestrained parabolas until they have acquired a kinetic energy of about 7.5 to 8 foot pounds per pound of aggregate, impinging the aggregates on a hard, rigid elastic surface inclined to the horizontal at an angle equal to 22.5° plus the angle of divergence from the vertical of the tangent to the drop parabolas at the point of impact with the surface, the angle of divergence having a positive value when the divergence from the vertical is in the direction of rebound and a negative value when the divergence from the vertical is away from the direction of rebound, intercepting in flight at a predetermined range of rebound a portion of the aggregates rebounding from said inclined surface having a hard stone and soft stone ratio substantially identical with that of the natural aggregate, collecting as the enriched product all aggregates rebounding beyond said predetermined range, returning the intercepted aggregate to the feed and repeating the cycle until no portion rebounds beyond said predetermined range and thereafter discarding the portion falling short of said predetermined range.

3. A method of selectively enriching natural loose mineral aggregate containing hard stones and soft stones to obtain a product with a lower soft stone content which comprises supplying a substantially mono-layer of aggregate in the free falling state along an unrestrained generally parabolic plane, impinging the aggregate, when it has attained a kinetic energy of about 7.5 to 8 foot pounds per pound of aggregate, on the surface of a rigid, hard elastic plate inclined to the horizontal, dividing the aggregates scattered by rebounding from said surface into at least three portions at different longitudinal rebound ranges from said plate, one an enriched aggregate product divided most remotely from the said plate, a second portion divided adjacent the enriched portion being a fraction whose hard to soft stone ratio is substantially identical with that of the natural aggregate and a third portion divided adjacent the plate embracing the balance of the aggregate, separately collecting each portion, returning the second portion to the feed supply of natural aggregate and subjecting it to a second rebounding and continuing in such fashion until no portion rebounds to the enriched aggregate portion, combining the remaining second and third portions so that the natural aggregate is separated into two fractions, an enriched fraction and a fraction high in soft stone.

4. A method of selectively enriching natural loose mineral aggregates containing hard stones and soft stones to obtain an enriched product with a lower soft stone content which comprises supplying a substantially mono-layer of aggregate in the free falling state along an unrestrained generally parabolic plane, impinging the aggregate, when it has attained a kinetic energy of about 7.5 to 8 foot pounds per pound of aggregate, on the surface of a rigid, hard elastic plate inclined at an angle to the horizontal equal to 22.5° plus the angle of divergence from the vertical of the tangent to the parabolic plane at the point of impact, the angle of divergence having a positive value when the divergence of the tangent from the vertical is toward the direction of rebound from the plate and having a negative value when the divergence is away from the direction of rebound, dividing the aggregates by rebounding from said surface into a plurality of portions at different longitudinal rebound ranges from said plate, one an enriched aggregate product divided most remotely from the said plate, a second portion divided adjacent the enriched portion being a fraction whose hard to soft stone ratio is substantially identical with that of the natural aggregate and a third portion divided adjacent the plate embracing the balance of the aggregate, separately collecting each portion, returning the second portion to the feed supply of natural aggregate and subjecting it to a second rebounding and continuing in such fashion until no portion rebounds to the enriched aggregate portion, combining the remaining second and third portions so that the natural aggregate is separated into two fractions, an enriched fraction and a fraction high in soft stone.

5. A mechanism for enriching loose mineral aggregates containing mixed hard stones and soft stones to obtain a product with a lower soft stone content comprising feeding means continuously discharging a monolayer of aggregate over a straight line lip into a free falling plate, a rebound plate spaced below the feeding means at an angle such that the angle between the tangent to the line of rebound at the point of impact and the horizontal is about 45° and divider means adjustably spaced from the impact means with the top thereof adjacent a horizontal plane through the point of impact whereby the stones are variably separated into at least three selected portions of differing rebound characteristics, one an enriched aggregate portion divided most remotely from the plate, a second portion divided adjacent the enriched portion and having a mixed hard stone and soft stone ratio substantially identical with that of the feed, and a third portion divided adjacent the plate embracing the balance of the aggregate, separate collecting means receiving each of said portions and conveyor means transferring the second portion from the collecting means to the feeding means whereby the second portion is admixed with the natural aggregate.

6. A method of recovering a hard stone enriched component from natural aggregate containing hard stones and soft stones comprising the steps of adding moisture to the aggregate to be treated in an amount sufficient to cause absorption by porous stones in the aggregate, maintaining the stones in contact with the moisture until a substantial amount of moisture is absorbed in the porous stones, feeding the aggregate into space, accelerating the aggregates by free fall in unrestrained parabolas until they have acquired a kinetic energy of about 7.5 to 8 foot pounds per pound of aggregate, impinging the aggregates on a hard elastic surface inclined to the horizontal, intercepting in flight at a predetermined range of rebound a portion of the aggregates rebounding from said inclined surface having a hard stone and soft stone ratio substantially identical with that of the natural aggregate, collecting as the enriched product all aggregates rebounding beyond said predetermined range, returning the intercepted aggregate to the feed and repeating the cycle until no portion rebounds beyond said predetermined range and thereafter discarding the portion falling short of said predetermined range.

7. A method of selectively enriching natural loose mineral aggregate containing hard stones and soft stones to obtain a product with a lower soft stone content which comprises adding moisture to the aggregate to be treated in an amount sufficient to cause absorption by porous stones in the aggregate, maintaining the stones in contact with the moisture until a substantial amount of moisture is absorbed in the porous stones, supplying a substantially mono-layer of aggregate in the free falling state along an unrestrained generally parabolic plane, impinging the aggregate, when it has attained a kinetic energy of about 7.5 to 8 foot pounds per pound of aggregate, on the surface of a rigid hard elastic plate inclined to the horizontal, dividing the aggregates scattered by rebounding from said surface into at least three portions at different longitudinal rebound ranges from said plate, one an enriched aggregate product divided most remotely from the said plate, a second portion divided adjacent the enriched portion being a fraction whose hard to soft stone ratio is substantially identical with that of the natural aggregate and a third portion divided adjacent the plate embracing the balance of the aggregate, separately collecting each portion, returning the second portion to the feed supply of natural aggregate and subjecting it to a second rebounding and continuing in such fashion until no portion rebounds to the enriched aggregate portion, combining the remaining second and third portions so that the natural aggregate is separated into two fractions, an enriched fraction and a fraction high in soft stone.

References Cited in the file of this patent

UNITED STATES PATENTS

| | | |
|---|---|---|
| 2,260,095 | Stevens | Oct. 21, 1941 |
| 2,607,482 | Weisz | Aug. 19, 1952 |

FOREIGN PATENTS

| | | |
|---|---|---|
| 462,707 | France | Nov. 28, 1913 |
| 656,038 | France | Dec. 24, 1928 |

UNITED STATES PATENT OFFICE

CERTIFICATE OF CORRECTION

Patent No. 2,932,393            April 12, 1960

Eugene H. Leslie

It is hereby certified that error appears in the printed specification of the above numbered patent requiring correction and that the said Letters Patent should read as corrected below.

Column 10, line 20, for "plate", first occurrence, read -- state --.

Signed and sealed this 9th day of August 1960.

(SEAL)
Attest:

KARL H. AXLINE
Attesting Officer

ROBERT C. WATSON
Commissioner of Patents